(12) United States Patent
Nishizawa et al.

(10) Patent No.: US 11,371,575 B1
(45) Date of Patent: Jun. 28, 2022

(54) COIL SPRING

(71) Applicant: NHK SPRING CO., LTD., Yokohama (JP)

(72) Inventors: Shinichi Nishizawa, Walled Lake, MI (US); Senri Moriyama, Yokohama (JP); Fang Dai, Novi, MI (US); Takeshi Furuse, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 0 days.

(21) Appl. No.: 17/113,438

(22) Filed: Dec. 7, 2020

(51) Int. Cl.
*F16F 1/04* (2006.01)

(52) U.S. Cl.
CPC .......... *F16F 1/043* (2013.01); *F16F 2226/00* (2013.01); *F16F 2228/066* (2013.01); *F16F 2232/08* (2013.01); *F16F 2238/026* (2013.01)

(58) Field of Classification Search
CPC . F16F 1/043; F16F 2228/066; F16F 2238/026
See application file for complete search history.

(56) References Cited

U.S. PATENT DOCUMENTS

| | | | |
|---|---|---|---|
| 231,150 A * | 8/1880 | Cliff | F16F 1/043 267/286 |
| 1,963,054 A | 6/1934 | Powers | |
| 3,727,902 A | 4/1973 | Burckhardt et al. | |
| 4,111,407 A * | 9/1978 | Stager | F16F 1/08 267/166 |
| 4,424,695 A | 1/1984 | Kirchhoff et al. | |
| 6,193,225 B1 * | 2/2001 | Watanabe | F16F 1/043 267/167 |
| 10,065,471 B2 | 9/2018 | Nishizawa | |
| 10,144,261 B2 | 12/2018 | Nishizawa | |
| 10,155,425 B2 | 12/2018 | Nishizawa | |

FOREIGN PATENT DOCUMENTS

| | | | |
|---|---|---|---|
| DE | 19619074 A1 * | 11/1997 | ............ F16F 1/043 |
| DE | 102014102061 A1 * | 8/2015 | ............ F16F 1/043 |
| JP | S15001179 Y1 | 2/1940 | |
| JP | S51129554 A | 11/1976 | |
| JP | S54052257 A | 4/1979 | |
| JP | S56141431 A | 11/1981 | |
| JP | S57011743 A | 1/1982 | |
| JP | S62155342 A | 7/1987 | |
| JP | 2000337415 A | 12/2000 | |

OTHER PUBLICATIONS

International Search Report and Written Opinion dated Jan. 18, 2022, issued in International Application No. PCT/JP2021/040372.

* cited by examiner

*Primary Examiner* — Vishal R Sahni
(74) *Attorney, Agent, or Firm* — Holtz, Holtz & Volek PC

(57) ABSTRACT

According to an embodiment, a coil spring includes a wire rod having an end and the other end. The wire rod of the coil spring includes, with regard to a section of the wire rod, a round section portion of an effective spring part, a square section portion in which the section is substantially square, and a taper portion. The square section portion includes an end turn part. A length of each side of the section of the square section portion is less than or equal to a square root of ½ multiplied by a diameter of the wire rod of the round section portion. In the taper portion, from the round section portion to the square section portion, the section changes from a round shape to substantially a square shape, and a sectional area is decreased.

6 Claims, 6 Drawing Sheets

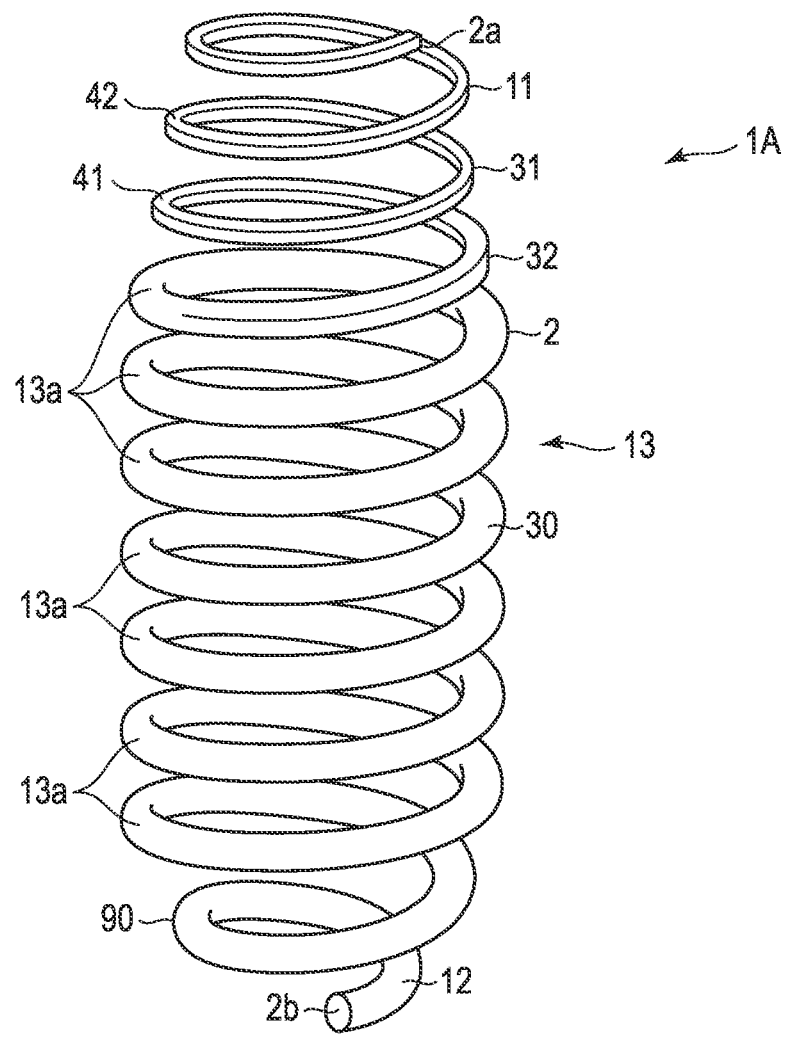
F I G. 10
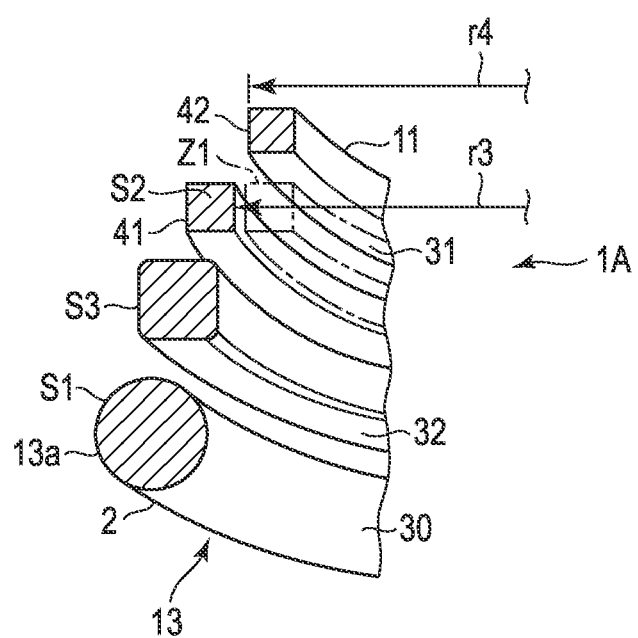
F I G. 11

COIL SPRING

BACKGROUND OF THE INVENTION

1. Field of the Invention

The present invention relates to a coil spring used for, for example, the suspension of a vehicle.

2. Description of the Related Art

An example of a coil spring used for the suspension of a vehicle is formed by a helically-wound wire rod. In general, the section of the wire rod of the coil spring (in other words, a section perpendicular to the length direction of the wire rod) is round. The coil spring comprises a first end turn part which is in contact with the first spring seat of the suspension, a second end turn part which is in contact with a second spring seat, and an effective spring part between the first end turn part and the second end turn part. The effective spring part comprises a plurality of coil portions. In a state where the coil spring is compressed into a predetermined length by a load, a gap is defined between the coil portions of the effective spring part. Each end turn part is always in contact with the spring seat regardless of the magnitude of the load. A part of the effective spring part comes into contact with the spring seat or moves away from the spring seat in accordance with the magnitude of the load.

The coil spring extends and retracts at a predetermined stroke between an assumed minimum load and maximum load. Depending on the vehicle, a coil spring having nonlinear characteristics may be desirable. In a coil spring having nonlinear characteristics, the spring constant changes in accordance with the magnitude of the load. For example, when the load is small, the coil spring is deflected with a first spring constant. When the load is large, the coil spring is deflected with a second spring constant. The second spring constant is greater than the first spring constant. A tapered coil spring in which the diameter of the wire becomes less toward an end of the wire from an intermediate portion of the effective spring part is also known. In the tapered coil spring, the stiffness of a taper portion is less. Thus, in an area where the load is small, mainly the taper portion is deflected. When the load is increased, the taper portion transitions to a close-contact state, and thus, the effective spring part is deflected, thereby having nonlinear characteristics.

In the tapered coil spring disclosed in JP S57-11743 A, the wire diameter is decreased from an intermediate portion of an effective spring part to the end turn part. In the tapered coil spring disclosed in JP S56-141431 A, the section of the wire rod of a taper portion and an end turn part has the shape of a rounded octagon similar to a circle. It is not easy to process a part in which the wire diameter is extremely less in a coil spring formed by a wire rod in which the section is substantially circular. For example, a particular reduction roll needs to be used to make the wire diameter sufficiently less by plastic working. The wire diameter may be made less by shaving or swaging. However, the processing cost is high, and the processing time is long. Thus, they are impractical. For these reasons, it was difficult to make the wire diameter of a part of the wire rod extremely less.

Even if there is a limit to a decrease in the wire diameter of a taper portion and a small-section portion in a coil spring having nonlinear characteristics, the spring constant in an area where the load is small may be decreased by increasing the number of turns of the taper portion and the small-section portion. However, the taper portion and the small-section portion of the coil spring having nonlinear characteristics transitions to a close-contact state when the load is large. The taper portion and the small-section portion become a dead turn part which does not function as a spring. The coil spring in which the number of turns of the dead turn part is large causes an increase in the weight of a vehicle.

The coil springs disclosed in JP 2000-337415 A and JP S54-52257 A form a flat portion having a section which is flat and rectangular by rolling a part of a wire rod in the length direction in other words, by rolling a portion which includes an end turn part). The flat portion having a rectangular section can be formed with comparative ease by using a common reduction roll. However, in a flat portion, the polar moment of inertia of area is very large in comparison with a wire rod having a round section. Thus, in a coil spring having nonlinear characteristics which comprise a flat portion, it was difficult to reduce a weight of the coil spring even though the spring which has desired nonlinear characteristics can be obtained.

BRIEF SUMMARY OF THE INVENTION

The present invention aims to provide a lightweight coil spring having nonlinear characteristics.

An embodiment of the present invention is a coil spring comprising a wire rod having an end and the other end. The coil spring comprises a first end turn part including the end of the wire rod, a second end turn part including the other end of the wire rod, and an effective spring part. The effective spring part comprises a plurality of coil portions formed between the first end turn part and the second end turn part, and has a gap between the coil portions adjacent to each other. The effective spring part comprises a round section portion in which a first section perpendicular to a length direction of the wire rod is round.

Further, the coil spring of the present embodiment comprises a square section portion formed from the end of the wire rod over a length of the first end turn part, and a taper portion formed between the round section portion and the square section portion and having 1.0 turns or greater. In the square section portion, a second section perpendicular to the length direction is substantially square, and a length of each side of the second section is less than or equal to a square root of ½ multiplied by a diameter of the wire rod of the round section portion, and the second section is constant in the length direction. In a section of the taper portion (in other words, a third section perpendicular to the length direction of the wire rod), a round shape changes to substantially a square shape and a sectional area decreases from the round section portion to the square section portion.

The square section portion can be formed with comparative ease by using a reduction roll, etc. In addition, it is not very difficult to make the sectional area of the square section portion sufficiently less than that of the round section portion.

The square section portion may comprise an outer first surface and an inner second surface along a central axis of the coil spring, and an upper third surface and a lower fourth surface perpendicular to the first surface and the second surface and parallel to each other. In the coil spring of the present embodiment, the square section portion comprises at least a first coil portion and a second coil portion, and may comprise a contact portion in which the third surface of the first coil portion is in contact with the fourth surface of the second coil portion in a state where the coil spring is compressed. A coil radius of the second coil portion of the square section portion may be less than a coil radius of the first coil portion.

The taper portion may comprise a first planar portion continuous with the first surface of the square section portion, a second planar portion continuous with the second surface, a third planar portion continuous with the third surface, a fourth planar portion continuous with the fourth surface, a first arc portion between the first planar portion and the third planar portion, a second arc portion between the first planar portion and the fourth planar portion, a third arc portion between the second planar portion and the third planar portion, and a fourth arc portion between the second planar portion and the fourth planar portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a perspective view of a coil spring according to a second embodiment.

FIG. 11 is a perspective view showing a part of the coil spring shown in FIG. 10 by a section.

DETAILED DESCRIPTION OF THE INVENTION

Hereinafter, this specification explains a coil spring according to an embodiment of the present invention with reference to FIG. 1 to FIG. 9.

Figure 1:
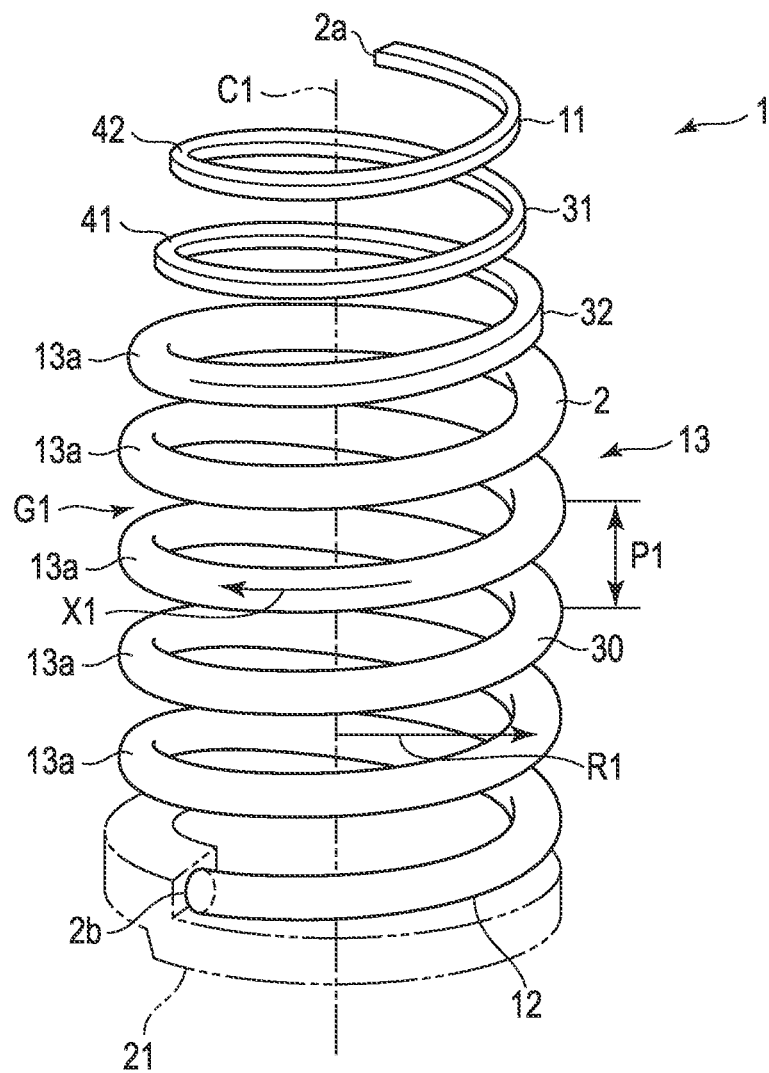
FIG. 1 is a perspective view of a coil spring according to a first embodiment.

FIG. 1 shows a coil spring 1 used for the suspension device of a vehicle such as an automobile. The coil spring 1 comprises a helically-wound wire rod 2. The wire rod 2 is formed of, for example, spring steel. The coil spring 1 comprises a first end turn part 11 including an end 2a of the wire rod 2, a second end turn part 12 including the other end 2b of the wire rod 2, and art effective spring part 13. The effective spring part 13 is formed between the first end turn part 11 and the second end turn part 12 and comprises a plurality of coil portions 13a. When the coil spring 1 is incorporated into the suspension device of a vehicle, the first end turn part 11 is located on the upper side, and the second end turn part 12 is located on the lower side. In this case, the central axis C1 of the coil spring 1 extends in a vertical direction.

An example of the effective spring part 13 has a cylindrical shape in which pitch P1 (shown in FIG. 1) is constant and coil radius R1 is substantially constant. Here, the expression "substantially constant" indicates that the variation in the range of the tolerance of the coil spring manufactured by a coiling machine and the variation in the acceptable range by springback are practically negligible. The coil spring may have a non-cylindrical shape in which pitch P1 and coil radius R1 change in a direction along the central axis C1.

The first end turn part 11 is supported by a spring seat 20 (shown in FIG. 2) provided in the upper part of the suspension device. As shown in FIG. 1, the second end turn part 12 is supported by a spring seat 21 provided in the lower part of the suspension device. The coil spring 1 is compressed between the upper spring seat 20 and the lower spring seat 21. In a state where the coil spring 1 is compressed in a predetermined loading area (in the range of the load used as the suspension device), the effective spring part 13 has a gap G1 between the coil portions 13a adjacent to each other.

The coil spring 1 used for the suspension device of a vehicle is used in a loading area between an assumed minimum load and maximum load. The effective spring part 13 effectively functions as a spring such that the coil portions 13a adjacent to each other are not in contact with each other in either a full-bump state where the coil spring is compressed to a minimum length or a full-rebound state where the coil spring extends to a maximum length.

Figure 2:
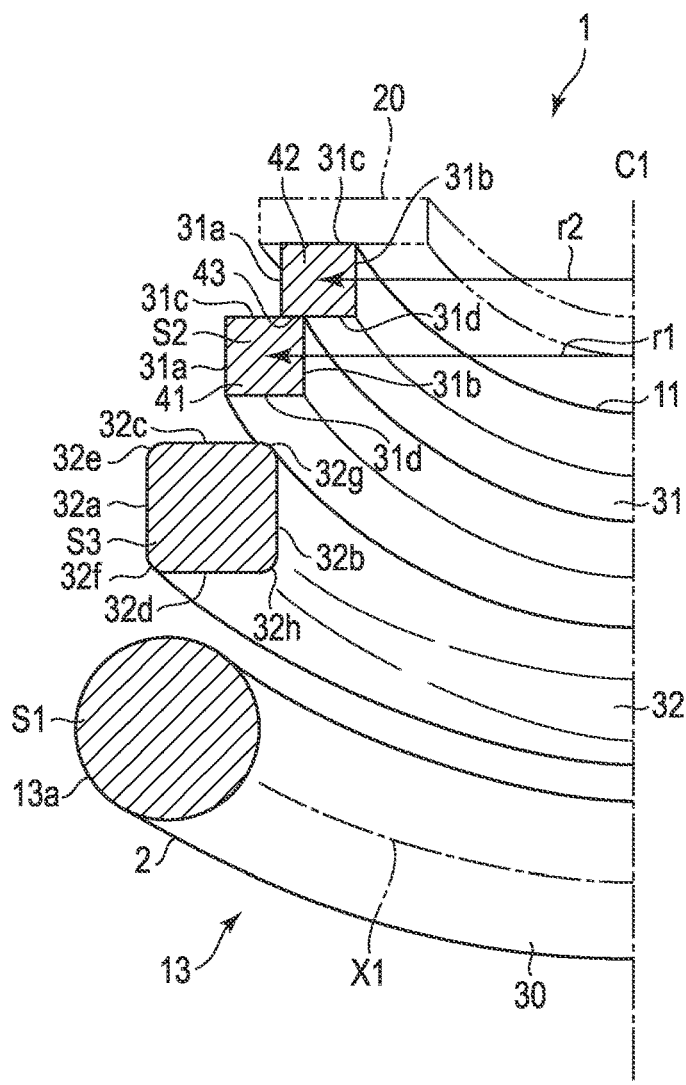
FIG. 2 is a perspective view in which a part of the coil spring shown in FIG. 1 is shown by a section in a state where the coil spring is compressed.

FIG. 2 is a perspective view showing a part of the coil spring 1 (the vicinity of the end turn part 11) by a section in a state where the coil spring 1 is compressed. The coil spring 1 of the present embodiment includes a round section portion 30 included in the effective spring part 13, a square section portion 31 which forms the first end turn part 11 and a part of the effective spring part 13, and a taper portion 32 formed between the round section portion 30 and the square section portion 31. The first end turn part 11 comprises the square section portion 31, and is helically formed. The second end turn part 12 comprises a part of the round section portion 301, and is helically formed. The effective spring part 13 includes the round section portion 30, and comprises the coil portions 13a which are helically formed.

Figure 3:
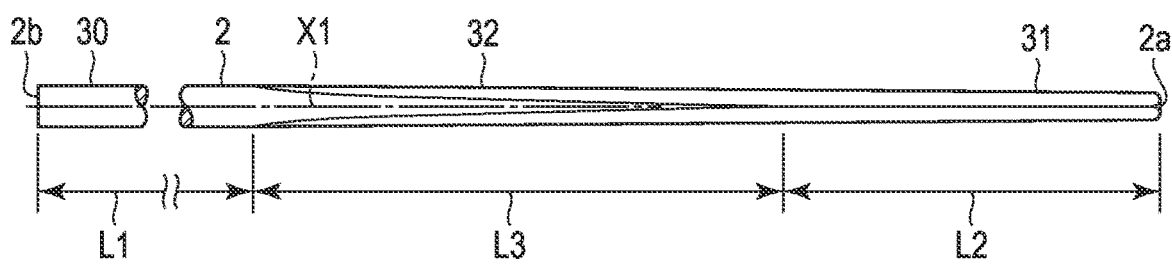
FIG. 3 is a side view showing a part of the wire rod of the coil spring before the wire rod is coiled.
Figure 4:
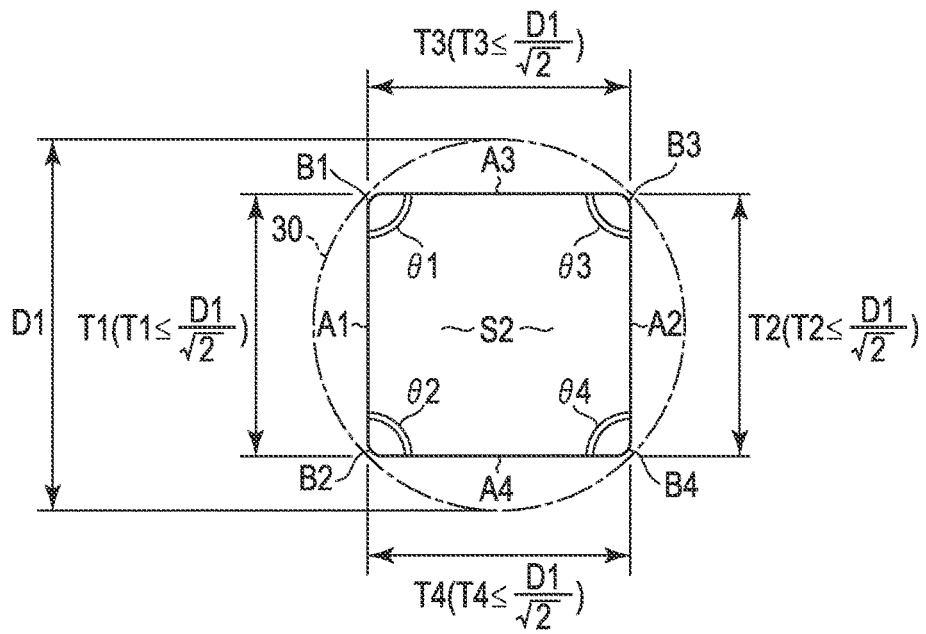
FIG. 4 is a sectional view schematically showing an example of the square section portion of the wire rod.

FIG. 3 shows a part of the wire rod 2 before the wire rod 2 is coiled. Axis X1 passing through the center of the wire rod 2 extends in the length direction of the wire rod 2. The wire rod 2 shown in FIG. 3 comprises the round section portion 30 having length L1, the square section portion 31 having length L2, and the taper portion 32 having length L3. The round section portion 30 has length L1 required for the coil portions 13a of the effective spring part 13. The square section portion 31 is formed from an end 2a of the wire rod 2 over length L2. The taper portion 32 is formed between the round section portion 30 and the square section portion 31 over length L3.

As shown in FIG. 2, the section of the round section portion 30 (in other words, first section S1 perpendicular to axis X1 of the wire rod 2) is round. The first section S1 is substantially constant in the length direction of the wire rod 2 (in other words, a direction along axis X1). Since the second end turn part 12 comprises a part of the round section portion 30, its section is round. The wire diameter of the second end turn part 12 is equal to that of the round section portion 30 of the effective spring part 13.

The square section portion 31 comprises an outer first surface 31a and an inner second surface 31b along the central axis C1 (shown in FIG. 1 and FIG. 2) of the coil spring 1, and an upper third surface 31c and a lower fourth surface 31d perpendicular to the first surface 31a. The third surface 31c and the fourth surface 31d are planes substantially perpendicular to the central axis C1 of the coil spring 1. The square section portion 31 comprises a first coil portion 41 and a second coil portion 42. Coil radius r2 of the second coil portion 42 is less than coil radius r1 of the first coil portion 41.

FIG. 2 shows a state in which the coil spring 1 is compressed by a load along the central axis C1. When the coil spring 1 is compressed, the upper surface 31c of the first coil portion 41 of the square section portion 31 overlaps the lower surface 31d of the second coil portion 42 in a direction along the central axis 1C of the coil spring 1. In this way, a contact portion 43 is formed. Thus, the second coil portion 42 is allowed to avoid getting into (sliding into) the inside of the first coil portion 41.

The section of the square section portion 31 (in other words, a second section S2 perpendicular to axis X1) is substantially square. In this specification, the expression "substantially square" does not strictly refer to a square in geometry. Like the second section S2 schematically shown in FIG. 4, the lengths T1, T2, T3 and T4 of the four sides A1, A2, A3 and A4 of the section should be equal to each other in the range of tolerance in terms of processing. Each of the lengths T1, T2, T3 and T4 of sides A1, A2, A3 and A4 is less than or equal to the square root of ½ (1/√2) multiplied by the diameter D1 of the round section portion 30. Interior angles θ1, θ2, θ3 and θ4 between sides A1, A2, A3 and A4 are substantially 90° in the range of tolerance in terms of processing. At the intersections of sides A1, A2, A3 and A4, round corner portions B1, B2, B3 and B4 may be formed. The second section S2 is substantially constant in the length 24 direction of the wire rod 2 (in other words, a direction along axis X1).

In the section of the taper portion 32 (in other words, a third section S3 perpendicular to axis X1), from the round section portion 30 to the square section portion 31, a round shape gradually changes to substantially a square shape, and further, the sectional area is decreased. The taper portion 32 is formed so as to have 1.0 turns or more between the round section portion 30 and the square section portion 31.

As shown in FIG. 2, the section of the taper portion 32 (the third section S3) comprises a first planar portion 32a, a second planar portion 32b, a third planar portion 32c, a fourth planar portion 32d, a first arc portion 32e, a second arc portion 32f, a third arc portion 32g and a fourth arc portion 32h. The first planar portion 32a is continuous with the first surface 31a of the square section portion 31. The first planar portion 32a is along the central axis C1 of the coil spring 1. The second planar portion 32b is continuous with the second surface 31b of the square section portion 31. The second planar portion 32b is along the central axis C1 of the coil spring 1. The third planar portion 32c is continuous with the third surface 31c of the square section portion 31. The third planar portion 32c is perpendicular to the first planar portion 32a. The fourth planar portion 32d is continuous with the fourth surface 31a of the square section portion 31. The fourth planar portion 32d is perpendicular to the first planar portion 32a.

The first arc portion 32e comprises a curved surface formed between the first planar portion 32a and the third planar portion 32c and having an arc shape. The second arc portion 32f comprises a curved surface formed between the first planar portion 32a and the fourth planar portion 32d and having an arc shape. The third arc portion 32g comprises a curved surface formed between the second planar portion 32b and the third planar portion 32c and having an arc shape. The fourth arc portion 32h comprises a curved surface formed between the second planar portion 32b and the fourth planar portion 32d and having an arc shape. These arc portions 32e, 32f, 32g and 32h are continuous with corner portions B1, B2, B3 and B4 of the square section portion 31 (shown in FIG. 4), respectively.

Figure 5:
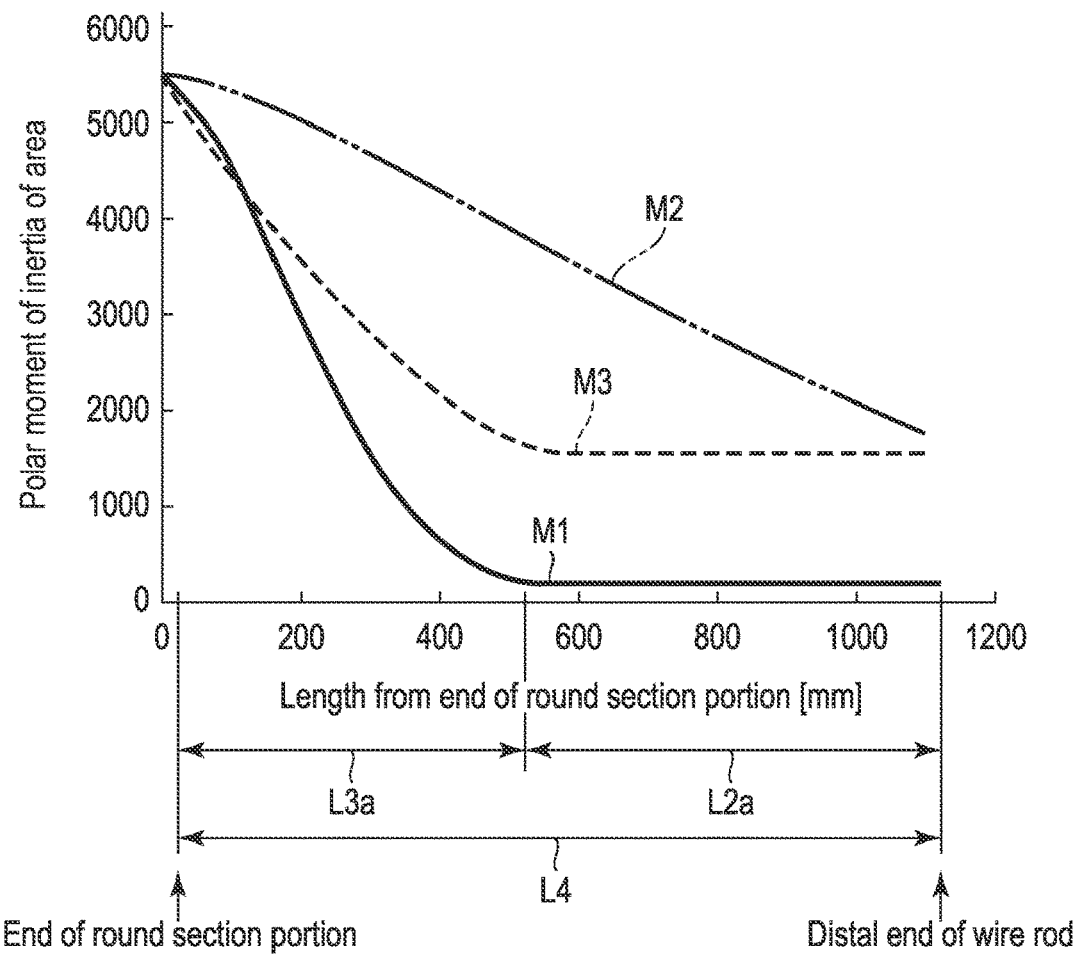
FIG. 5 is a diagram showing the polar moment of inertia of area of each of three types of wire rods having different sections.

FIG. 5 shows the relationship between the positions of the three types of wire rods having different sections in the length direction and a polar moment of inertia of area (torsional stiffness). In FIG. 5, the solid line M1 indicates the polar moment of inertia of area of the wire rod 2 of the present embodiment (shown in FIG. 3). The wire diameter of the round section portion 30 of the present embodiment is 15.4 mm, and the length of each side of the square section portion 31 is 6 mm. In FIG. 5, length L3a from zero (0) in the horizontal axis is the polar moment of inertia of area of the taper portion 32, and length L2a is the polar moment of inertia of area of the square section portion 31. The polar moment of inertia of area of the square section portion 31 is sufficiently less than that of the round section portion 30.

In FIG. 5, the two-dot chain line M2 indicates the polar moment of inertia of area of the wire rod of conventional example 1 comprising a flat taper portion. The wire rod of conventional example 1 comprises a flat taper portion over length L4 from the end of a round section portion in which the wire diameter is 15.4 mm to the distal end of the wire rod. The section of the flat taper portion is flat and rectangular. An end surface of the flat taper portion has a width of 15.4 mm and a thickness of 5.5 mm. The polar moment of inertia of area of conventional example 1 comprising the flat taper portion (shown by the two-dot chain line M2) is much greater than that of the present embodiment (shown by the solid line M1). To decrease the first spring constant of conventional example 1 comprising the flat taper portion, the number of turns of the flat taper portion needs to be increased. Thus, in a state where the conventional coil spring (conventional example 1) is compressed in a second spring constant area, the number of turns of a dead turn part is increased, thereby increasing the weight.

In FIG. 5, the broken line M3 indicates the polar moment of inertia of area of the wire rod of conventional example 2 comprising a round taper portion. The wire rod of conventional example 2 comprises a round taper portion having length L3a from the end of a round section portion, and a small-section portion having length L2a (with a wire diameter of 11.4 mm). Wire diameter of the round section portion is 15.4 mm. The polar moment of inertia of area of conventional example 2 (shown by the broken line M3) is greater than that of the present embodiment (shown by the solid line M1). To decrease the first spring constant of conventional example 2 comprising the round taper portion, the number of turns of the round taper portion needs to be increased. Thus, in a state where the conventional coil spring (conventional example 2) is compressed in a second spring constant area, the number of turns of a dead turn part is increased, thereby increasing the weight.

When the polar moment of inertia of area of a square section is equal to that of a round section, the length of each side of the square section is approximately 0.87 to 0.89 of the diameter of the round section. Thus, the difference between them is small. There is not much difference in torsional stiffness between a round section and a square section having sizes substantially equal to each other. It is not easy to form a round taper portion in which the diameter is extremely less by processing a wire rod having a round section. However, the square section portion 31 can be formed with comparative ease by using at least a pair of reduction rolls. Plastic working may be also practically applied to form the square section portion such that the length of each side of the section becomes less than or equal to the square root of ½ multiplied by the wire diameter of the round section portion.

Figure 6:
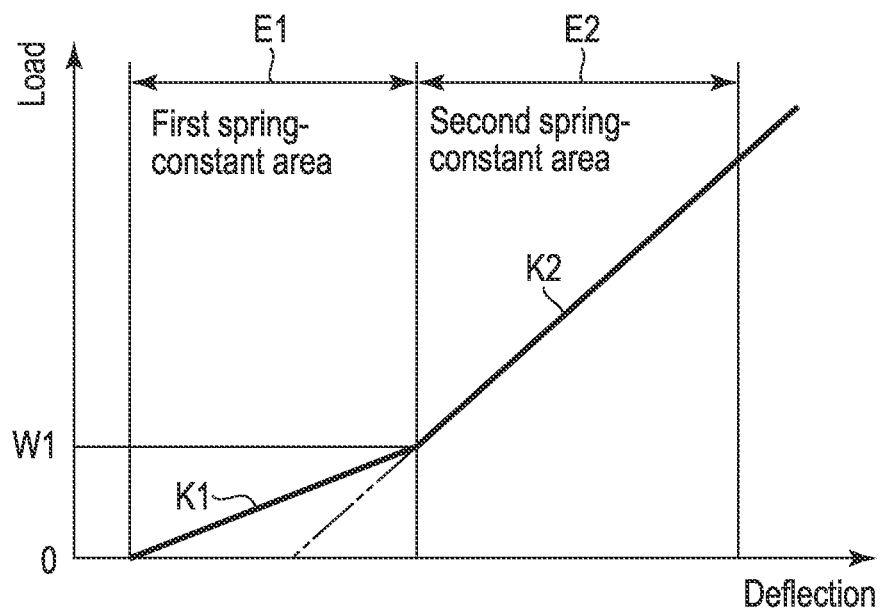
FIG. 6 is a diagram schematically showing the spring characteristics of the coil spring shown in FIG. 1 (the relationship between deflection and a load).

FIG. 6 schematically shows the spring characteristics of the coil spring 1 of the present embodiment (the relationship between a load and deflection). In FIG. 6, the horizontal axis shows deflection, and the vertical axis shows a load. The coil spring 1 is compressed between the lower spring seat 21 (shown in FIG. 1) and the upper spring seat 20 (shown in FIG. 2). When the load is between zero and W1, mainly the square section portion 31 is deflected. Thus, as shown by line K1 of FIG. 6, a first spring-constant area E1 in which the spring constant is comparatively less is applied. When the load exceeds W1, the square section portion 31 transitions to a close-contact state, and the round section portion 30 of the effective spring part 13 is deflected. Thus, as shown by line K2 of FIG. 6, the spring constant becomes great (a second spring-constant area E2).

Figure 7:
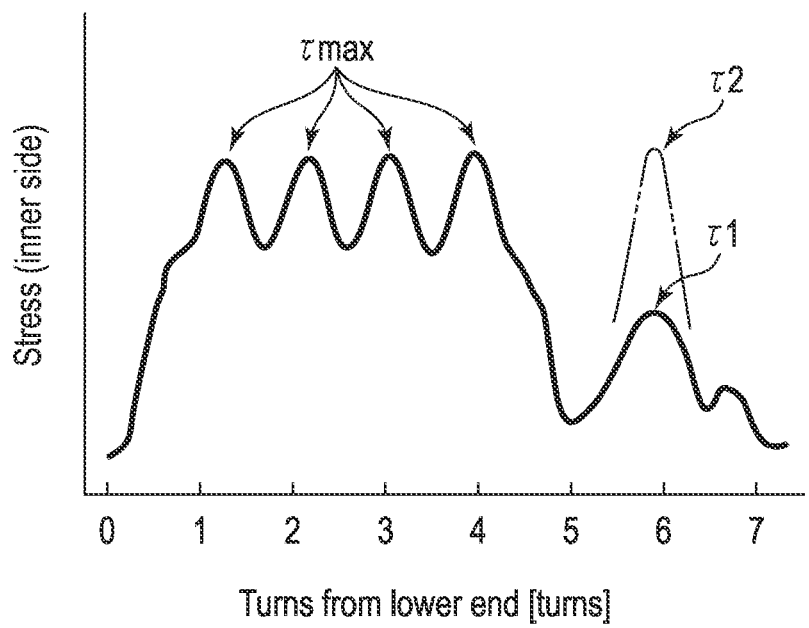
FIG. 7 is a diagram showing the turns from the lower end of the coil spring and a stress (inner side of coil).

FIG. 7 shows the relationship between a stress generated on the inner side of the wire rod when the coil spring 1 is compressed and the turns from the lower end of the wire rod 2. A peak τmax of the stress is generated for each coil portion 13a of the effective spring part 13. These peaks τmax are less than the stress accepted in the suspension device. A small peak τ1 is generated in the vicinity of the end turn part 11. After the inventors of the present application dedicated themselves to research, it was found that the stress of the taper portion 32 exceeds the peak τmax of the stress of the effective spring part 13 when the number of turns of the taper portion 32 is less than 1.0 as shown by τ2 of FIG. 7. It is preferable that the stress of the taper portion 32 should not exceed that of the effective spring part 13. For this reason, in the present embodiment, the number of turns of the taper portion 32 is made greater than or equal to 1.0.

Figure 8:
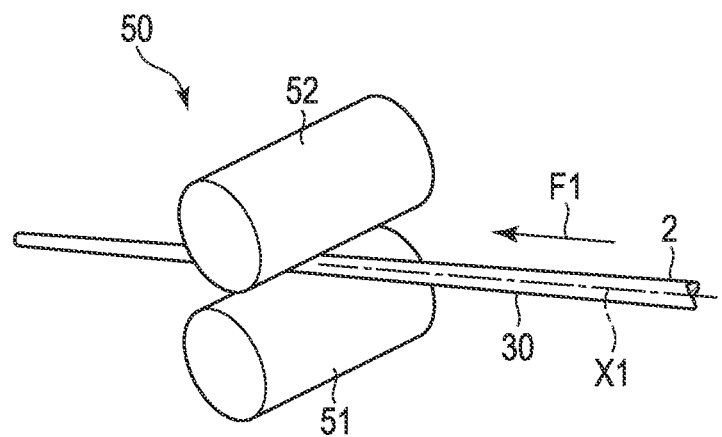
FIG. 8 is a perspective view schematically showing a rolling device.

FIG. 8 schematically shows a rolling device 50 which forms the square section portion 31 and the taper portion 32 in the wire rod 2 having a round section. The wire rod 2 moves in the direction shown by arrow F1. The rolling device 50 comprises pair of rolls 51 and 52. Gap between the rolls 51 and 52 can be controlled. When the wire rod 2 passing through the rolls 51 and 52, the wire rod 2 is rolled by the rolls 51 and 52. After that the wire rod 2 is rotated about axis X1 at 90° and the wire rod 2 is rolled again by the rolls 51 and 52.

Figure 9:
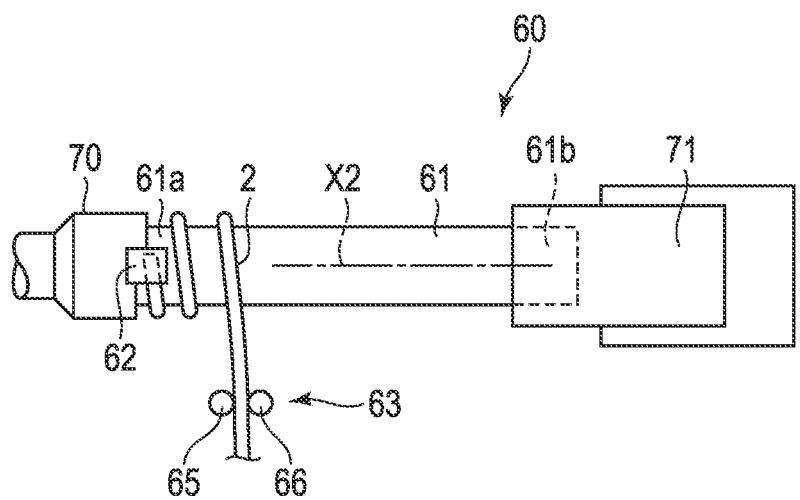
FIG. 9 is a plan view of a part of a coiling machine.

FIG. 9 shows a part of a coiling machine 60 which manufactures the coil spring by hot forming (for example, greater than or equal to $A_3$ transformation point and less than or equal to 1150° C.). The coiling machine 60 includes a columnar mandrel 61, a chuck 62, and a guide portion 63. The guide portion 63 includes a pair of first guide rolls 65 and 66.

The wire rod 2 formed of spring steel is prepared in advance by cutting a wire rod into the length of one coil spring. The wire rod 2 is heated to an austenitizing temperature (greater than or equal to $A_3$ transformation point and less than or equal to 1150° C.), and is supplied to the mandrel 61 by a feed mechanism. The chuck 62 secures the distal end of the wire rod 2 to the mandrel 61. The guide portion 63 controls the position of the wire rod 2 wound around the mandrel 61 by guiding the wire rod 2. An end portion 61a of the mandrel 61 is held by a drive head 70 with the chuck 62. The mandrel 61 rotates about axis X2 by the drive head 70. The other end 61b of the mandrel 61 is rotatably supported by a mandrel holder 71. The guide portion 63 moves in a direction along axis X2 of the mandrel 61, and guides the wire rod 2 in accordance with the pitch angle of the coil spring to be formed.

The wire rod 2 has a length correspond to the length of one coil spring. Before the wire rod 2 is supplied to the mandrel 61, the wire rod 2 is heated by a furnace. The distal end of the heated wire rod 2 is secured to the mandrel 61 by the chuck 62. The mandrel 61 rotates. In synchronization with the rotation of the mandrel 61, the guide portion 63 moves in a direction along axis M2 of the mandrel 61. In this way, the wire rod 2 is wound around the mandrel 61 at a predetermined pitch.

Each of comparative examples 1, 2, 3 and 4 described below is a coil spring which comprises a round section portion of an effective spring part, and a round small-section portion which includes an end turn part, and which has nonlinear characteristics. Each of practical examples 1, 2, 3 and 4 is a coil spring which comprises the round section portion 30, the square section portion 31, and the taper portion 32, and which has nonlinear characteristics, in a manner similar to that of the coil spring 1 shown in FIG. 1.

Comparative Example 1

In the coil spring of comparative example 1, the wire diameter of the round section portion of the effective spring part is 18 mm. The wire diameter of the small-section portion is 13 mm. The total number of turns is 8.5. The weight is 7.0 kg.

Practical Example 1

In the coil spring of practical example 1, the wire diameter of the round section portion 30 of the effective spring part is 18 mm. The length of each side of the section of the square section portion 31 is 7 mm. The total number of turns is 8.5. The length of each side of the section of the square section portion 31 is 40% of the wire diameter of the round section portion 30. The spring characteristics (the relationship between a load and deflection) of practical example 1 are equivalent to those of comparative example 1. The weight of the coil spring of practical example 1 is 5.2 kg, and is less than that of the coil spring of comparative example 1 by approximately 24%.

Comparative Example 2

In the coil spring of comparative example 2, the wire diameter of the round section portion of the effective spring part is 15 mm. The wire diameter of the small-section portion is 11 mm. The total number of turns is 8.5. The weight is 7.0 kg.

Practical Example 2

In the coil spring of practical example 2, the wire diameter of the round section portion 30 of the effective spring part is 15 mm. The length of each side of the section of the square section portion 31 is 7 mm. The total number of turns is 9.0. The length of each side of the section of the square section portion 31 is 47% of the wire diameter of the round section portion 30. The spring characteristics of practical example 2 are equivalent to those of comparative example 2. The weight of the coil spring of practical example 2 is 4.0 kg, and is less than that of the coil spring of comparative example 2 by approximately 23%.

Comparative Example 3

In the coil spring of comparative example 3, the wire diameter of the round section portion of the effective spring part is 22 mm. The wire diameter of the small-section portion is 17 mm. The total number of turns is 8.0. The weight is 8.5 kg.

Practical Example 3

In the coil spring of practical example 3, the wire diameter of the round section portion 30 of the effective spring part is 22 mm. The length of each side of the section of the square section portion 31 is 7 mm. The total number of turns is 8.0. The length of each side of the section of the square section portion 31 is 32% of the wire diameter of the round section portion 30. The spring characteristics of practical example 3 are equivalent to those of comparative example 3. The weight of the coil spring of practical example 3 is 6.5 kg, and is less than that of the coil spring of comparative example 3 by approximately 22%.

Comparative Example 4

In the coil spring of comparative example 4, the wire diameter of the round section portion of the effective spring part is 16 mm. The wire diameter of the small-section portion is 12 mm. The total number of turns is 10.0. The weight is 6.0 kg.

Practical Example 4

In the coil spring of practical example 4, the wire diameter of the round section portion 30 of the effective spring part is 15 mm. The length of each side of the section of the square section portion 31 is 7 mm. The total number of turns is 9.0. The length of each side of the section of the square section portion 31 is 47% of the wire diameter of the round section portion 30. The spring characteristics of practical example 4 are equivalent to those of comparative example 4. The weight of the coil spring of practical example 4 is 5.0 kg, and is less than that of the coil spring of comparative example 4 by approximately 18%.

The length of each side of the section of the square section portion 31 of each of the coil springs of practical examples 1 to 4 is less than or equal to 50% of the wire diameter of the round section portion 30. When the square section portion 31 is formed, the lengths of the sides of the section may slightly differ from each other. However, as the length of each side of the section of the square section portion is made less than or equal to the square root of ½ multiplied by the wire diameter of the round section portion, the weight can be reduced by approximately 20% in comparison with the conventional coil springs.

FIG. 10 shows a coil spring 1A according to a second embodiment. FIG. 11 is a perspective view showing a part of the coil spring 1A (the vicinity of an end turn part 11) by a section. The coil spring 1A comprises a square section portion 31 having 2 turns or more, and a taper portion 32 having 1.0 turns or more. The section of the wire rod of a second end turn part 12 is round. The wire diameter of the second end turn part 12 is equal to that of a round section portion 30. The second end turn part 12 comprises a less-diameter coil portion 90 in which the coil diameter is decreased toward the other end 2b of the wire rod 2. The wire diameter of the second end turn part 12 may be less than that of the round section portion 30.

The square section portion 31 which includes the first end turn part 11 of the coil spring 1A comprises at least a first coil portion 41 and a second coil portion 42. An outer coil diameter r4 of the second coil portion 42 is less than an inner coil diameter r3 of the first coil portion 41. When the coil spring 1A is compressed, as shown by the two-dot chain lines Z1 in FIG. 11, the second coil portion 42 is allowed get into the inside of the first coil portion 41.

The other structures and effects are common to the coil spring 1A of the second embodiment and the coil spring 1 of the first embodiment. Therefore, common reference numbers are added to both of them, explanations thereof being omitted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring comprising a wire rod having a first end and a second end, the coil spring comprising:
   a first end turn part including the first end of the wire rod;
   a second end turn part including the second end of the wire rod; and
   an effective spring part which comprises a plurality of coil portions formed between the first end turn part and the second end turn part, and which has a gap provided between each pair of two adjacent coil portions among the plurality of coil portions,
   wherein the wire rod comprises:
      a round section portion, a first section of the round section portion taken perpendicular to a length direction of the wire rod being round;
      a square section portion provided from the first end of the wire rod over a length of the first end turn part, the square section portion having at least 2.0 turns, the square section portion comprising at least a first coil portion and a second coil portion, the square section portion further comprising a contact portion in which the first coil portion contacts with the second coil portion in a state in which the coil spring is compressed, a second section of the square section portion taken perpendicular to the length direction being substantially square, a length of each side of the second section being no greater than a square root of ½ multiplied by a diameter of the wire rod at the round section portion, the second section being constant in the length direction, and lengths of the four sides of the second section being equal to each other within a range of tolerance in terms of processing; and
      a taper portion provided between the round section portion and the square section portion, the taper portion having at least 1.0 turns, a third section of the taper portion taken perpendicular to the length direction changing from a round shape to a substantially square shape, and a sectional area of the third section decreasing from the round section portion to the square section portion.

2. The coil spring of claim 1, wherein the square section portion comprises a first surface and a second surface provided on outer and inner sides, respectively, with respect to a central axis of the coil spring, and a third surface and a fourth surface which are perpendicular to the first surface and the second surface and are parallel to each other.

3. The coil spring of claim 2, wherein the first coil portion includes the third surface, the second coil portion includes the fourth surface, and the third surface contacts with the fourth surface at the contact portion in the state in which the coil spring is compressed.

4. The coil spring of claim 2, wherein the taper portion comprises a first planar portion continuous with the first surface, a second planar portion continuous with the second surface, a third planar portion continuous with the third surface, a fourth planar portion continuous with the fourth surface, a first arc portion between the first planar portion and the third planar portion, a second arc portion between the first planar portion and the fourth planar portion, a third arc portion between the second planar portion and the third planar portion, and a fourth arc portion between the second planar portion and the fourth planar portion.

5. The coil spring of claim 1, wherein a section of the wire rod at the second end turn part is round, and a diameter of the wire rod at the second end turn part is equal to the diameter of the wire rod at the round section portion.

6. The coil spring of claim 1, wherein a length of each side of the square section portion is no greater than 50% of the diameter of the wire rod at the round section portion.

* * * * *